United States Patent [19]

Durrell et al.

[11] 4,262,163
[45] Apr. 14, 1981

[54] BUSWAY PHASE TRANSPOSITION ASSEMBLY

[75] Inventors: James M. Durrell, Selmer, Tenn.; Werner A. Krause, Plantsville, Conn.

[73] Assignee: General Electric Company, New York, N.Y.

[21] Appl. No.: 87,118

[22] Filed: Oct. 22, 1979

[51] Int. Cl.³ .............................................. H01B 7/08
[52] U.S. Cl. ...................................... 174/34; 174/33; 174/88 B; 310/213; 336/187
[58] Field of Search ............. 174/33, 34, 88 B, 129 B, 174/133 B; 310/213; 336/187

[56] References Cited

U.S. PATENT DOCUMENTS

| | | | |
|---|---|---|---|
| 1,620,552 | 3/1927 | Jacobs | 174/33 |
| 2,310,684 | 2/1943 | Farry | 174/34 X |
| 3,213,183 | 10/1965 | Weimer | 174/88 B |
| 3,280,244 | 10/1966 | Pannen | 174/34 |
| 3,587,169 | 6/1971 | Benke | 336/187 X |

*Primary Examiner*—Richard R. Kucia
*Attorney, Agent, or Firm*—Robert A. Cahill; Walter C. Bernkopf; Philip L. Schlamp

[57] ABSTRACT

In a busway having plural busbars disposed with their broad sides in face-to-face relation, the ends of longitudinally aligned outside busbars are cut at complementary angles to create a single edge connecting segment for each busbar which extends through a phase transposition zone. Upper and lower transverse connectors are welded at their opposed ends to transversely aligned edge connecting segments to effectively reverse the phase positions of the busbars upstream and downstream of the transposition zone. If the busway includes two inside busbars, phase transposition is achieved in similar fashion. Once insulatively coated, the phase transpositioned busbars are nested together to create a compact transposition zone having a transverse dimension no greater than the busway therebeyond.

11 Claims, 8 Drawing Figures

4,262,163

BUSWAY PHASE TRANSPOSITION ASSEMBLY

BACKGROUND OF THE INVENTION

The present invention relates to electrical busway and particularly to an improved, compact busway phase transposition assembly.

It is quite common in electrical busway applications to require physical transpositioning of the individual busbars at some point in a busway run in order to facilitate proper phasing of the electrical connections of the individual busbars at each end of the busway run to separate electrical instrumentalities. One example is where a busway run interconnects two switchboards. Since the busway typically consists of rigid busbars in essentially side-by-side relation, it is physically impossible to interconnect the individual busbars of the two switchboards with the proper phasing without, at some intermediate point, physically transpositioning the busbars of the connecting busway run. Busway phase transposition assemblies heretofore utilized in this and other analogous situations are extremely bulky and both difficult to fabricate and install.

It is accordingly an object of the present invention to provide an improved busway phase transposition assembly.

A further object is to provide a busway phase transposition assembly of the above character which is compact in size, efficient in construction and convenient to install.

Other objects of the invention will in part be obvious and in part appear hereinafter.

SUMMARY OF THE INVENTION

In accordance with the present invention, there is provided an improved phase transposition assembly for utilization with electrical busway consisting of plural, essentially flat, individually insulated busbars disposed in intimate relation with their broad faces in side-by-side relation. By virtue of the present invention, a phase transposition zone is created having a transverse dimension no greater than the transverse dimension of the busway upstream and downstream therefrom. Basically, the ultimate compactness of the subject phase transposition assembly is achieved by cutting the longitudinally aligned ends of the two sets of outside busbars entering the transposition region from opposite directions at complementary angles. The complementary angular end cuts for one pair of longitudinally aligned outside busbars are angularly displaced from the complementary angular end cuts for the other aligned outside busbar pair. There is thus created, in the case of each busbar, a single busbar connecting segment which extends with the other busbar connecting segments through the transposition zone. The transversely aligned busbar connecting segments are then rigidly electrically connected to perfect separate phase transposition joints. Thus, the phase positions of the two outside busbars as they enter the transposition zone are reversed from one side to the other on leaving the transposition zone.

If the busway is simply a three-bar, three-phase run, the center busbar, e.g., B phase, is left uncut for continuous extension through the transposition zone, the phase transpositioned outside busbars are individually, insulatively coated and then nested together about the insulatively coated center busbar to create a phase transposition assembly having a transposition region whose transverse dimension is held to an absolute minimum, i.e., a transverse dimension no greater than the transverse dimension of the busway upstream and downstream therefrom.

For busway including three phase busbars and a neutral busbar, the longitudinally aligned ends of the two sets of outside busbars are cut at complementary angles in the manner generally described above. The longitudinally aligned ends of the two sets of inside busbars are cut in like fashion to create individual connecting segments extending through the transpositioning region. The transversely aligned connecting segments are then physically and electrically interconnected. Thus, the phase positions of the two inside busbars as they enter the transposition zone are also reversed on leaving the transposition zone. The individually insulated phase transpositioned outside busbars are then nested together about the phase transpositioned inside busbars to create a phase transposition assembly having a transverse dimension no greater than the transverse dimension of the busway upstream and downstream therefrom.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawings, in which.

Corresponding reference numerals refer to like parts throughout the several views of the drawings.

DETAILED DESCRIPTION

Figure 1:
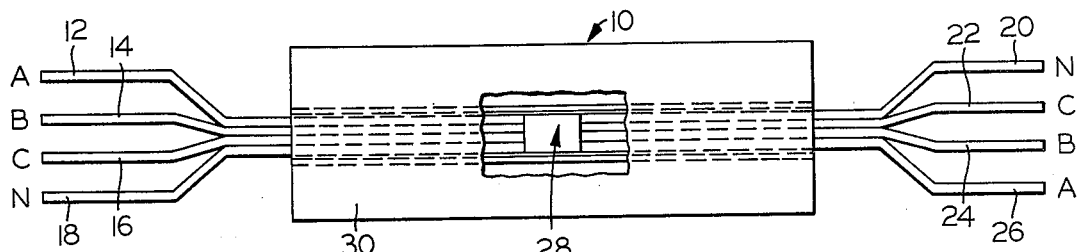
FIG. 1 is a generalized plan view of a four-bar busway phase transposition assembly constructed in accordance with the present invention.

The busway phase transposition assembly of the present invention is illustrated somewhat schematically in FIG. 1 as being embodied in a busway section, generally indicated at 10, of an appropriate length comprising four busbars 12, 14, 16 and 18 entering from the left and four busbars 20, 22, 24 and 26 entering from the right to converge on a transposition zone, generally indicated at 28. The individually, insulatively coated busbars are essentially flat with their broad faces juxtaposed in sandwiched relation and are encased in a housing 30. The ends of the busbars external to the housing are fanned out transversely to accommodate bus joints (not shown) connecting phase transposition section 10 end to end with conventional busway sections in making up a bus run. As will be seen, busbars 12, 14, 16 and 18 are respectively individually interconnected with busbars 26, 24, 22 and 20 in transposition region 28 to transpose the phasing on the former from ABCN to NCBA on the latter busbars.

Figure 2:
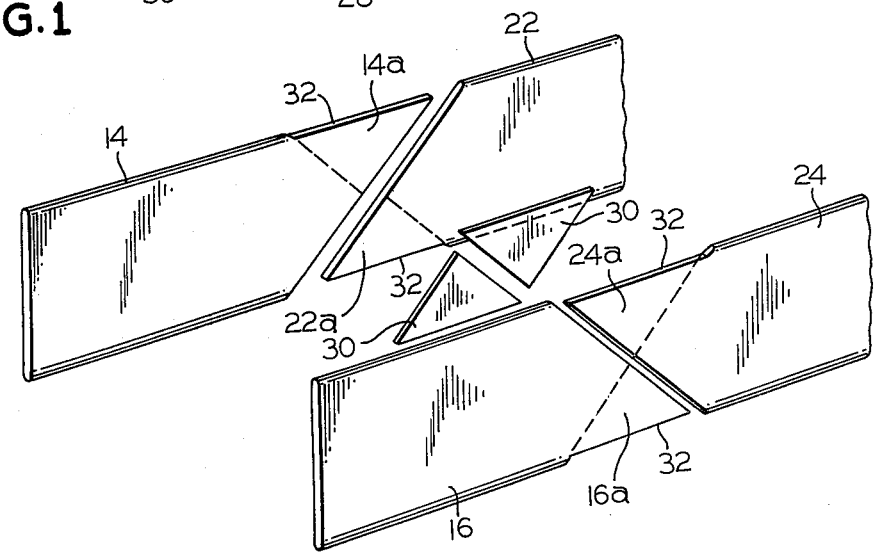
FIG. 2 is an exploded, perspective view of the phase transpositions for the two inside or B and C phase busbars of the assembly of FIG. 1.

Phase transposition of the inside or center sets of busbars 14, 16 and 22, 26 in transposition zone 28 is achieved in accordance with the present invention in the manner illustrated in FIG. 2. The ends of busbars 14 and 22, which are longitudinally aligned in the transposition zone, are cut off at complementary angles, as are the ends of longitudinally aligned busbars 16 and 24. The matching angular cuts for the ends of busbars 14 and 22 are displaced from the matching angular cuts for the ends of busbars 16 and 24 by a suitable angle, preferably 90 degrees to simplify fabrication and to achieve uniformity of the electrical transposition joints in the transposition zone, as will become apparent. For the same reasons, the ends of the longitudinally aligned busbars are preferably cut off at 45 degree complementary angles. From FIG. 2, it is seen, by virtue of these angular cuts and their relative angular displacements, that busbar 14 projects a triangular connecting segment 14a through the transition zone which is transversely aligned with a matching triangular connecting segment 24a of busbar 24. Similarly, busbar 16 projects a triangular connecting segment 16a through the transposition zone which is transversely aligned with a matching triangular connecting segment 22a of busbar 22. It is further noted that transversely aligned connecting segments 14a, 24a are not transversely aligned with the transversely aligned connecting segments 16a, 22a; the former occupying the upper portion of the transposition zone and the latter occupying the lower portion thereof. It then remains to edge weld the pairs of transversely aligned triangular connecting segments together to create separate phase transposition electrical joints. Preferably, triangular spacers 30 are sandwiched between the transversely aligned connecting segments to account for the thickness of the insulative coatings applied to the busbars and their welded phase transposition joints. Under these circumstances the center pair of insulatively coated, phase transpositioned busbars readily nest together in the manner illustrated in FIG. 6 where it is seen that their phase transposition joints take up no more space than the busbars themselves.

Figure 3:
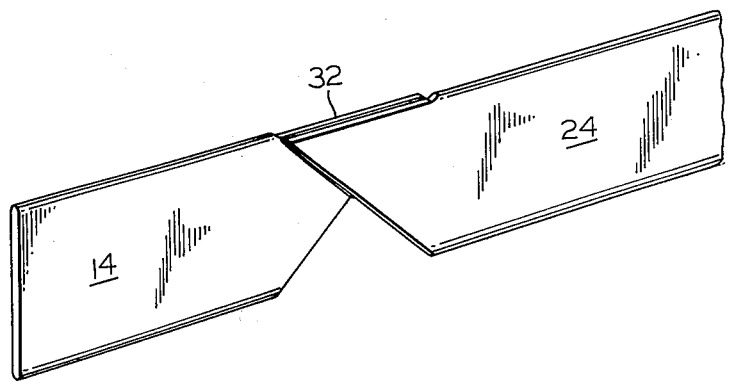
FIG. 3 is a perspective view of an assembled one of the phase transpositions of FIG. 2.

FIG. 3 depicts busbars 14 and 24 and their interconnecting welded phase transposition joint. It will be appreciated that busbars 16 and 22 and their welded phase transposition joint would appear as in FIG. 3, except turned 180 degrees. Preferably, the upper edges of connecting segments 14a, 24a and the lower edges of connecting segments 16a, 22a are slightly relieved, as commonly indicated at 32, to afford clearance for the outside busbar phase transposition joints to be described and thus further contribute to the compactness of the phase transposition zone.

Figure 4:
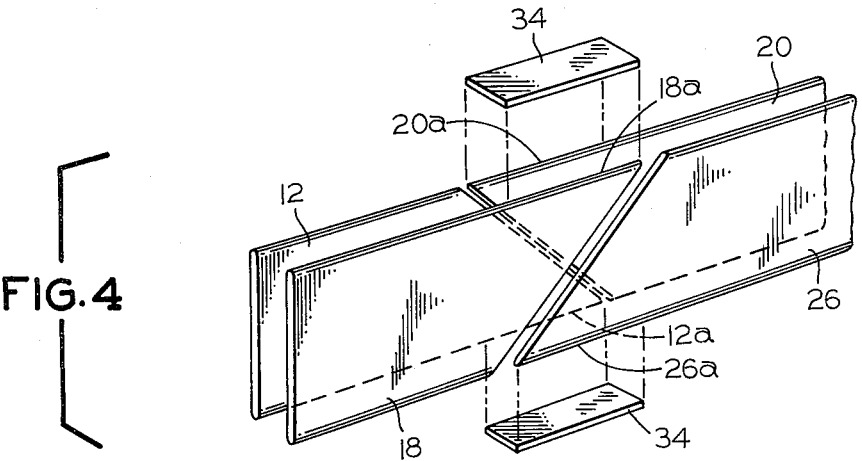
FIG. 4 is an exploded perspective view of the two outside or A phase and N (neutral) busbars of the assembly of FIG. 1.
Figure 5:
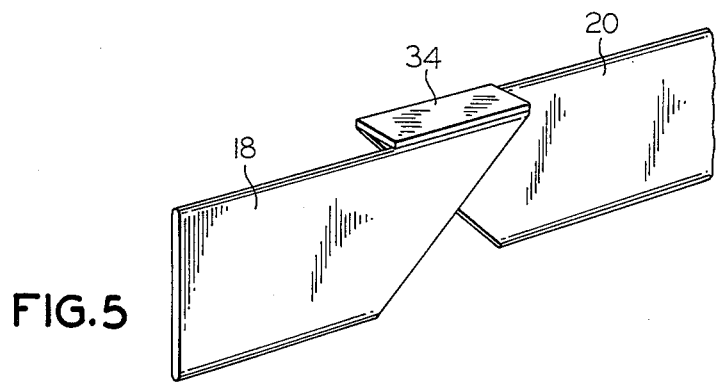
FIG. 5 is a perspective view of an assembled one of the phase transpositions of FIG. 4.
Figure 6:
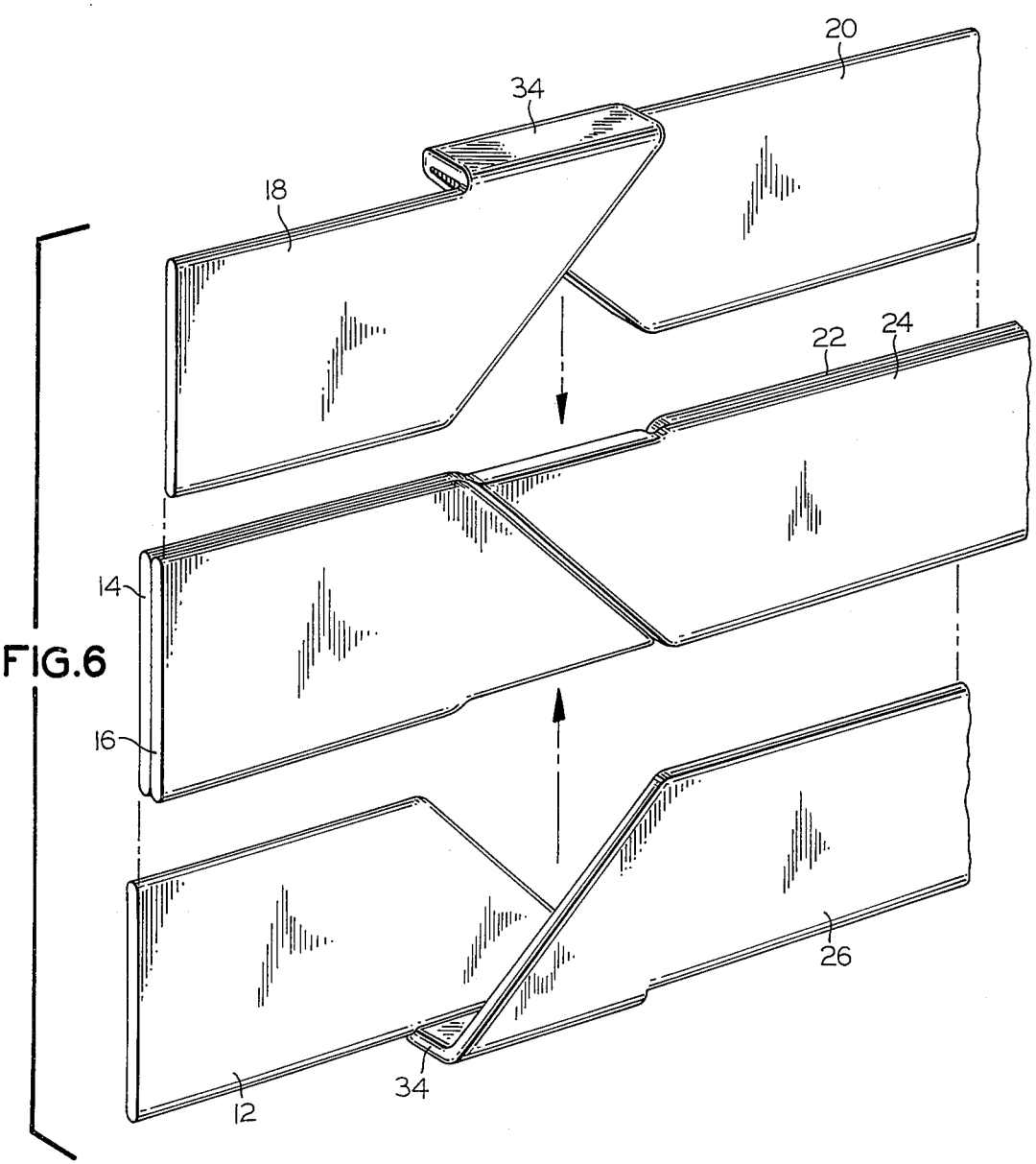
FIG. 6 is an exploded, perspective assembly view of the phase transpositions of FIGS. 2 and 4.
Figure 7:
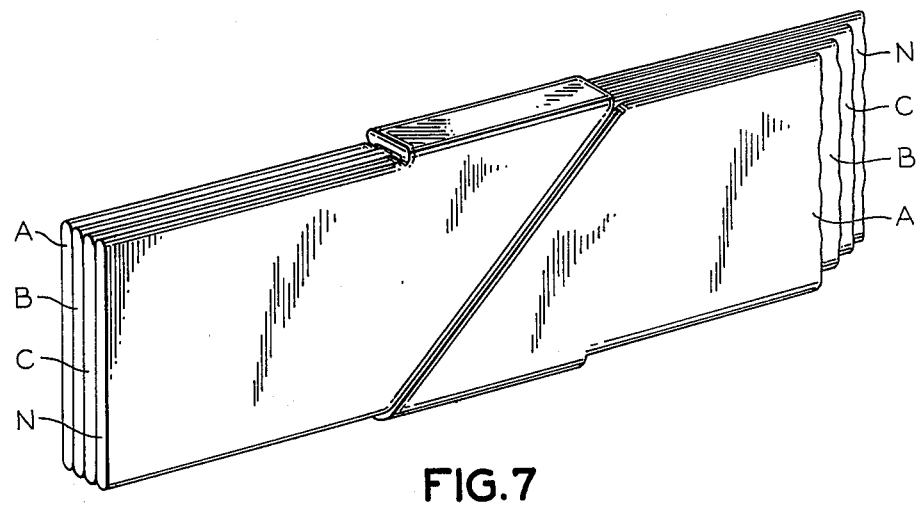
FIG. 7 is a perspective view of the assembled phase transpositions of FIGS. 2 and 4.

Phase transposition of the outer sets of busbars 12, 18 and 20, 26 in transposition zone 28 is achieved in the manner illustrated in FIG. 4. The ends of busbars 12 and 20, which are aligned in the transposition zone, are cut off at complementary angles, again preferably 45 degrees, while the ends of longitudinally aligned busbars 18 and 26 are cut off at complementary 45 degree angles. Again the angular cuts are displaced by preferably 90 degrees for the reasons stated above. From FIG. 4, it is seen that, by virtue of these angular cuts and their relative angular displacements, busbar 12 projects an edge connecting segment 12a through the transposition zone which is transversely aligned with a coextensive edge connecting segment 26a of busbar 26. Similarly, busbar 18 projects an edge connecting segment 18a through the transposition zone which is transversely aligned with a coextensive edge connecting segment 20a of busbar 20. It is further noted that the transversely aligned connecting segments 18a, 20a are not transversely aligned with connecting segments 12a, 26a; the former being disposed adjacent the upper boundary of the transposition zone and the latter disposed adjacent the lower boundary thereof. To perfect phase transposition joints between the outside pairs of busbars, separate connectors or conductive splice plates, commonly indicated at 34, are welded along their longitudinal edges to the transversely aligned edge connecting segments (FIG. 5). The transverse dimension of the splice plates is sufficient to account for the transverse dimension of the insulatively coated, nested center pair of phase transpositioned busbars, as seen in FIG. 6, plus the thickness of the insulative coating subsequently applied to the outside pair of busbars and their welded phase transposition joints. Under these circumstances, the outside pair of insulatively coated, phase transpositioned busbars readily nest with each other and with the nested center pair of phase transpositioned busbars in the manner illustrated in FIG. 6. When the outside and center pairs of phase transpositioned busbars are assembled in nested relation, as depicted in FIG. 7, it is seen that the transverse dimension of the transposition zone containing the four welded phase transposition joints is no greater than the transverse dimension of the side-by-side busbars upstream and downstream therefrom. Since the splice plates 34 of the phase transposition joints between the outside sets of busbars must clear the edges of center busbar sets in the transposition zone, a slight increase in vertical dimension is necessary. However, this can be minimized by increasing the depth of the edge reliefs 32.

Figure 8:
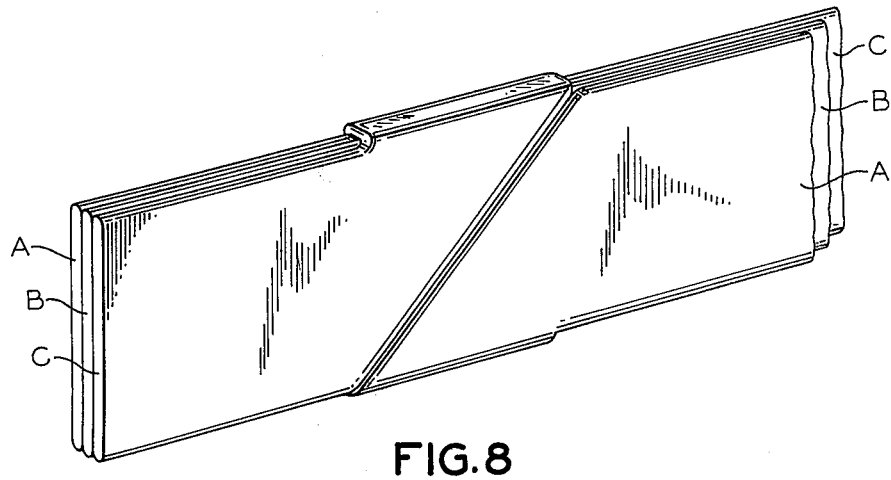
FIG. 8 is a perspective view of assembled three bar phase transpositions constructed in accordance with the present invention.

FIG. 8 illustrates a phase transposition assembly for a three-bar busway which simply involves transpositioning the outside sets of busbars in the manner described. The center or B phase busbar is left uncut for continuous extension through the transposition zone. Welded transposition joints for the outside pairs are created in the same fashion as described above; the only difference being the transverse dimension of the splice plates which need be only sufficient to account for the thickness of the insulative coating applied to the phase transpositioned outside busbars.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by Letters Patent is:

1. A busway phase transposition assembly comprising, in combination:

A. first and second outside busbars disposed in parallel spaced relation and converging on a transposition zone from one direction;

B. third and fourth outside busbars disposed in parallel spaced relation and converging on said transposition zone from the opposite direction;

(1) said first and third outside busbars being in longitudinal alignment and having their ends cut off at complementary angles, (2) said second and fourth outside busbars being in longitudinal alignment and having their ends cut off at complementary angles, (3) the cut, matching ends of said first and third outside busbars being angularly displaced from the cut, matching ends of said second and fourth outside busbars, (4) whereby said cut ends of said first and fourth outside busbars project transversely aligned connecting segments through said transposition zone and said cut ends of said second and third outside busbars project transversely aligned connecting segments through said transposition zone, said connecting segments of said first and fourth outside busbars being non-transversely aligned with said connecting segments of said second and third outside busbars;

C. a first phase transposition electrical joint rigidly interconnecting said connecting segments of said first and fourth outside busbars;

D. a second phase transposition electrical joint rigidly interconnecting said connecting segments of said second and third outside busbars;

E. separate insulative layers completely coating said first and fourth outside busbars and their first transposition joint and said second and fourth outside busbars and their second phase transposition joint; and F. at least one insulatively coated center busbar extending through said transposition zone, said insulatively coated, phase transposition joined outside busbars being nested together about said center busbar.

2. The busway phase transposition assembly defined in claim 1, wherein said outside busbar connecting segments comprise separate edge connecting segments thereof, and said first and second phase transposition joints respectively comprise separate, transverse, conductive splice plates welded along their longitudinal edges to said transversely aligned edge connecting segments, the transverse extensions of said splice plates in said transposition zone lying in close proximity to the longitudinal edges of said center busbar.

3. The busway phase transposition assembly defined in claim 1, wherein said ends of said first and third outside busbars and said ends of said second and fourth outside busbars are each cut off at complementary 45 degee angles.

4. The busway phase transposition assembly defined in claim 3, wherein the angular displacement between the cut ends of said first and third outside busbars and the cut ends of said second and fourth busbars is approximately 90 degrees.

5. The busway phase transposition assembly defined in claim 4, wherein said outside busbar connecting segments comprise separate edge connecting segments thereof, and said first and second phase transposition joints respectively comprise separate, transverse, conductive splice plates welded along their longitudinal edges to said transversely aligned edge connecting segments, the transverse extensions of said splice plates in said transposition zone lying in close proximity to the longitudinal edges of said center busbar.

6. The busway phase transposition assembly defined in claim 1, wherein said center busbar comprises:

A. first and second inside busbars disposed in parallel spaced relation intermediate said first and second outside busbars and converging on said transposition zone from one direction;

B. third and fourth inside busbars disposed in parallel spaced relation intermediate said third and fourth outside busbars and converging on said transposition zone from the opposite direction;

(1) said first and third inside busbars being in longitudinal alignment and having their ends cut off at complementary angles, (2) said second and fourth inside busbars being in longitudinal alignment and having their ends cut off at complementary angles, (3) the cut, matching ends of said first and third inside busbars being angularly displaced from the cut, matching ends of said second and fourth inside busbars, (4) whereby said cut ends of said first and fourth inside busbars project transversely aligned connecting segments through said transposition zone and said cut ends of said second and third inside busbars project transversely aligned connecting segments through said transposition zone, said connecting segments of said first and fourth inside busbars being non-transversely aligned with said connecting segments of said second and third inside busbars;

C. a third phase transposition electrical joint rigidly interconnecting said connecting segments of said first and fourth inside busbars;

D. a fourth phase transposition electrical joint rigidly interconnecting said connecting segments of second and third inside busbars; and E. separate insulative layers completely coating said first and fourth inside busbars and their third transposition joint and said second and fourth inside busbars and their fourth phase transposition joint, (1) said insulatively coated, phase transposition joined inside busbars being nested together with said insulatively coated, phase transposition joined outside busbars nested together about said nested inside busbars.

7. The busway phase transposition assembly defined in claim 6, wherein said outside busbar connecting segments comprise separate edge connecting segments thereof, and said first and second phase transposition joints respectively comprise separate, transverse, conductive splice plates welded along their longitudinal edges to said transversely aligned edge connecting segments of said outside busbars, the transverse extensions of said splice plates in said transposition zone lying in close proximity to the longitudinal edges of said nested inside busbars, and said third and fourth phase transposition joints comprise separate welds interconnecting said transversely aligned connecting segments of said inside busbars.

8. The busway phase transposition assembly defined in claim 6, wherein said respectively longitudinally aligned ends of said first and third outside and inside busbars and said respectively longitudinally aligned ends of said second and fourth outside and inside busbars are cut off at complementary 45 degree angles.

9. The busway phase transposition assembly defined in claim 8, wherein the angular displacement between the cut ends of said first and third outside busbars and the cut ends of said second and fourth busbars is approximately 90 degrees, and the angular displacement between the cut ends of said first and third inside busbars and the cut ends of said second and fourth inside busbars is approximately 90 degrees.

10. The busway phase transposition assembly defined in claim 9, wherein said busbar connecting segments comprise separate edge connecting segments thereof, and said first and second phase transposition joints respectively comprise separate, transverse, conductive splice plates welded along their longitudinal edges to said transversely aligned edge connecting segments of said outside busbars, the transverse extensions of said splice plates in said transposition zone lying in close proximity to the longitudinal edges of said nested inside busbars, and said third and fourth phase transposition joints comprise separate welds interconnecting said transversely aligned connecting segments of said inside busbars.

11. The busway phase transposition assembly defined in claim 7, wherein said third and fourth phase transposition joints each include a separate spacer interposed between the transversely aligned connecting segments of said inside busbars.

* * * * *